(No Model)

O. P. MONROE.
COOKING UTENSIL.

No. 586,195. Patented July 13, 1897.

WITNESSES
Harry L. Ames.
J. S. Bowen.

INVENTOR
Orin P. Monroe.
by John Wedduburn
Attorney

UNITED STATES PATENT OFFICE.

ORIN P. MONROE, OF MacCLURE SETTLEMENT, NEW YORK.

COOKING UTENSIL.

SPECIFICATION forming part of Letters Patent No. 586,195, dated July 13, 1897.

Application filed January 7, 1897. Serial No. 618,286. (No model.)

*To all whom it may concern:*

Be it known that I, ORIN P. MONROE, a citizen of the United States, residing at MacClure Settlement, in the county of Broome and State of New York, have invented certain new and useful Improvements in Cooking Utensils; and I do hereby declare the following to be a full, clear, and exact description of the invention, such as will enable others skilled in the art to which it appertains to make and use the same.

This invention has reference to a novel construction in a culinary utensil, and has for its object to provide a device that can be conveniently used for frying, baking, and steaming eggs, puddings, and the like.

The invention consists in the features of construction hereinafter described and specifically claimed.

Figure 1:
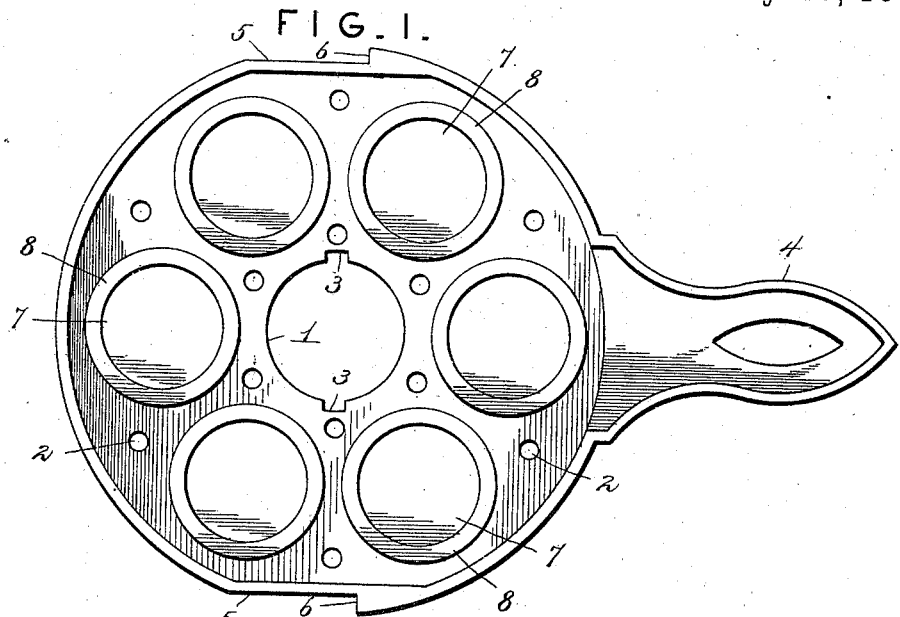
Figure 2:
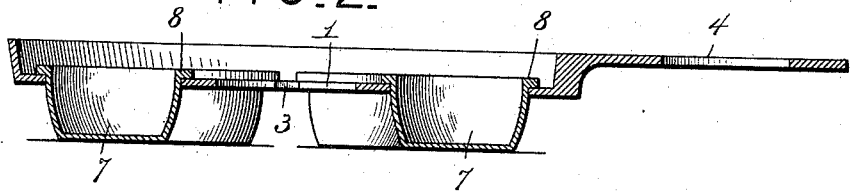
Figure 3:
Figure 4:
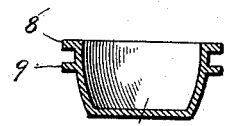
Figure 5:
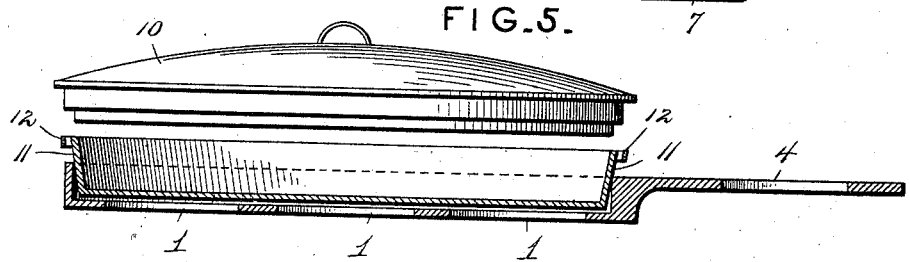

In the accompanying drawings, forming a part of this specification, Figure 1 is a top plan view of a utensil constructed in accordance with this invention and with one of the cups removed. Fig. 2 is a sectional view of the same. Fig. 3 is a side elevation of one of the cups. Fig. 4 is a sectional view of the same, and Fig. 5 is a sectional view illustrating another construction comprised by this invention.

In accordance with the principle involved by this invention I employ a frame having a plurality of circular openings 1 and smaller openings 2. The said circular openings 1 are provided with oppositely-arranged notches 3. The said frame is also provided with a handle 4 and with flat sides 5, it being noted that otherwise the frame is circular in plan. The said flat sides are also provided with the shoulders or stops 6 for, the purpose to be hereinafter referred to.

The cups 7 are shaped in the ordinary manner with flat bottoms, while the upper end of the cup fits snugly within the openings 1 of the frame. These cups are also provided at their upper ends with an outwardly-extending flange 8, adapted to rest upon the upper face of the frame. The said cups are also provided with lateral extending ears or lugs 9, that are situated a little distance below the flanges and sufficient to receive the edge of the frame between them.

It is seen from the foregoing description that the cups can be placed within the openings and locked by first passing the ears or lugs 9 through the notches 3 and then turning the cup. In this way the frame may be placed upon a stove and covered by a removable cover 10 and used for baking or frying, as is obvious. When it is to be used as a steamer, it can be placed over a kettle or pan containing water, and when used in connection with a kettle the flat sides 5 are adapted to pass between the handle-lugs of the kettle and to be held in position by the stops 6. In steaming the openings 2 provide for the outlet of the steam. It is obvious of course that other cups can be used with the frame when it is used as a steamer—for instance, when it is desired to steam puddings or cook other articles requiring larger cups. In Fig. 5 is shown an attachment to be used in connection with the parts above described and when it is desired to steam vegetables, &c. In said figure the part 11 fits closely within the frame and rises above the upper edge of the same and is provided with handles 12, by means of which it can be easily inserted or removed.

This part or pan 11 is provided with small openings for the passage of steam, and its upper end is large enough to receive and form a close joint with the cover 11 in the manner shown.

Having thus described my invention, what I claim as new, and desire to secure by Letters Patent, is—

1. In a cooking utensil, a frame provided with a handle and a plurality of circular openings 1 and smaller openings 2, said circular openings 1 having oppositely-arranged notches, and cups situated within said circular openings 1, said cups being provided with flanges at their upper ends and with laterally-extending ears below said flanges.

2. In a cooking utensil, a frame having a handle and provided with a plurality of openings and cups, said frame having oppositely-arranged flat sides and stops.

In testimony whereof I have signed this specification in the presence of two subscribing witnesses.

ORIN P. MONROE.

Witnesses:
A. R. SMITH,
FRED RECTOR.